(12) United States Patent
Suzuki et al.

(10) Patent No.: US 9,211,841 B2
(45) Date of Patent: Dec. 15, 2015

(54) STEP APPARATUS FOR VEHICLE

(71) Applicant: Aisin Seiki Kabushiki Kaisha, Kariya-shi (JP)

(72) Inventors: Seiichi Suzuki, Miyoshi (JP); Shin Sakai, Kariya (JP); Eisuke Nakanishi, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/597,378

(22) Filed: Jan. 15, 2015

(65) Prior Publication Data

US 2015/0203043 A1    Jul. 23, 2015

(30) Foreign Application Priority Data

Jan. 17, 2014   (JP) ................. 2014-006667

(51) Int. Cl.
    *B60R 3/02*      (2006.01)
    *E05F 15/06*    (2006.01)
    *E05F 15/14*    (2006.01)
    *E05F 1/16*      (2006.01)

(52) U.S. Cl.
    CPC ... *B60R 3/02* (2013.01); *E05F 1/16* (2013.01); *E05F 15/06* (2013.01); *E05F 15/14* (2013.01)

(58) Field of Classification Search
    None
    See application file for complete search history.

(56) References Cited

U.S. PATENT DOCUMENTS

| 3,935,674 | A | * | 2/1976 | Williams et al. | 49/212 |
| 5,286,049 | A | * | 2/1994 | Khan | 280/163 |
| 5,316,365 | A | * | 5/1994 | Kuhlman et al. | 296/155 |
| 2013/0307291 | A1 | * | 11/2013 | Suzuki et al. | 296/209 |

FOREIGN PATENT DOCUMENTS

JP    2011-183834    9/2011

* cited by examiner

*Primary Examiner* — S. Joseph Morano
*Assistant Examiner* — Hilary L Johns
(74) *Attorney, Agent, or Firm* — Oblon, McClelland, Maier & Neustadt, L.L.P.

(57) ABSTRACT

A step apparatus for a vehicle includes a step panel facing an opening formed at a body of a vehicle and fixed to a step support portion which is provided at the body, the step panel made of resin and securing a moving path of an opening and closing member, the moving path being secured at a void defined between the step panel and the step support portion in a height direction of the vehicle, and a leg member connected to the step panel and configured to extend between the step panel and the step support portion at a predetermined position on the moving path in an open state of the opening and closing member, the leg member moving away from the moving path for clearing the moving path before the opening and closing member reaches the leg member during a closing operation of the opening and closing member.

4 Claims, 5 Drawing Sheets

Opening operation

FIG. 4B

Closing operation

FIG. 5

STEP APPARATUS FOR VEHICLE

CROSS REFERENCE TO RELATED APPLICATIONS

This application is based on and claims priority under 35 U.S.C. §119 to Japanese Patent Application 2014-006667, filed on Jan. 17, 2014, the entire content of which is incorporated herein by reference.

TECHNICAL FIELD

This disclosure generally relates to a step apparatus for a vehicle.

BACKGROUND DISCUSSION

A known step apparatus for a vehicle is disclosed, for example, in JP2011-183834A which will be hereinafter referred to as Reference 1. The step apparatus disclosed in Reference 1 is made of carbon-fiber reinforced plastic. The aforementioned step apparatus includes an outer frame portion which at least partially extends along an outline of a planar form of the step apparatus and a beam portion which is connected to an inner side of the outer frame portion to extend from a vehicle inner side to a vehicle outer side. Each of the outer frame portion and the beam portion includes a substantially C-shape cross section. The step apparatus further includes a guide rail which is integrally formed for guiding a slide door in an opening and closing direction thereof. Accordingly, the step apparatus may be reduced in weight by 50% as compared to a case where the apparatus is made of steel while ensuring rigidity and strength substantially equal to steel.

A further reduction in weight is still desired for the step apparatus disclosed in Reference 1. At this time, it is considered to reduce a thickness of the step apparatus entirely or partially and to form a reinforcing rib at a rear side of a portion where strength is required. Nevertheless, an optimization design of such configuration may have limitations. In addition, in the step apparatus, plural attachment bosses are integrally formed at a portion closer to the vehicle inner side so that the step apparatus is mounted to a vehicle body via the attachment bosses. As a result, the step apparatus is fixed to the vehicle body in a cantilever beam manner. Thus, in a case where a user places one's foot to weight on a portion of the step apparatus closer to the vehicle outer side when the user gets in or out of a vehicle, a large load may be applied locally to an end of the portion fixed to the vehicle body in the cantilever beam manner. In order to overcome the foregoing drawback, a large reinforcement may be desired at the aforementioned portion, however, the large reinforcement is a trade-off from the weight reduction.

A need thus exists for a step apparatus for a vehicle which is not susceptible to the drawback mentioned above.

SUMMARY

According to an aspect of this disclosure, a step apparatus for a vehicle includes a step panel facing an opening formed at a body of a vehicle and fixed to a step support portion which is provided at the body, the step panel made of resin and securing a moving path of an opening and closing member that is configured to open and close the opening, the moving path being secured at a void defined between the step panel and the step support portion in a height direction of the vehicle, and a leg member connected to the step panel and configured to extend between the step panel and the step support portion at a predetermined position on the moving path in an open state of the opening and closing member, the leg member moving away from the moving path for clearing the moving path before the opening and closing member reaches the leg member during a closing operation of the opening and closing member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment will be explained with reference to the attached drawings. In the following, a front-rear direction corresponds to a vehicle front-rear direction, and an upper side (i.e., a top) and a lower side (i.e., a bottom) correspond to an upper side and a lower side in a vehicle height direction respectively. Further, a vehicle inner side and a vehicle outer side correspond to an inner side in a vehicle width direction towards a vehicle cabin and an outer side in the vehicle width direction away from the vehicle cabin respectively.

Figure 5:
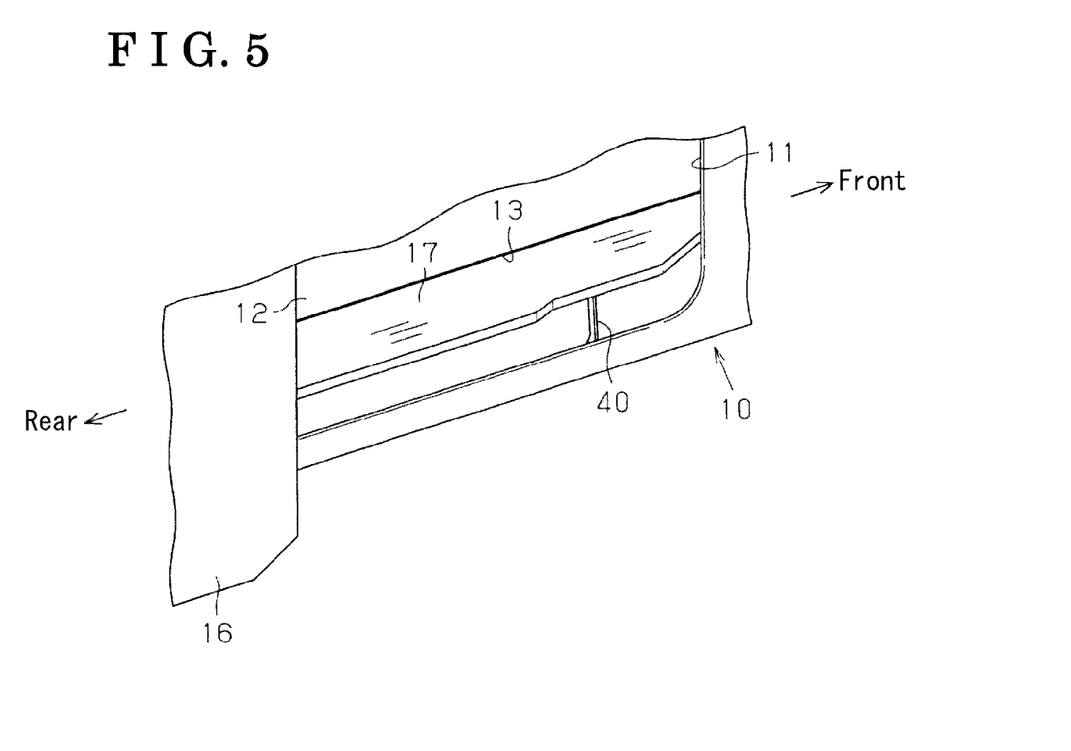
FIG. 5 is a perspective view of a vehicle at which the step apparatus according to the embodiment is mounted.

As illustrated in FIG. 5, an opening 11 through which a passenger gets in and out of a vehicle is formed at a body 10 for the vehicle. A slide door 16 serving as an opening and closing member for opening and closing the opening 11 is supported at the body 10 to be movable in the front-rear direction. In addition, a recess portion 13 is formed at a floor 12 for the vehicle so as to face the opening 11. A step panel 17 functioning as a step when a passenger gets in and out of the vehicle is mounted to the recess portion 13.

Figure 1:
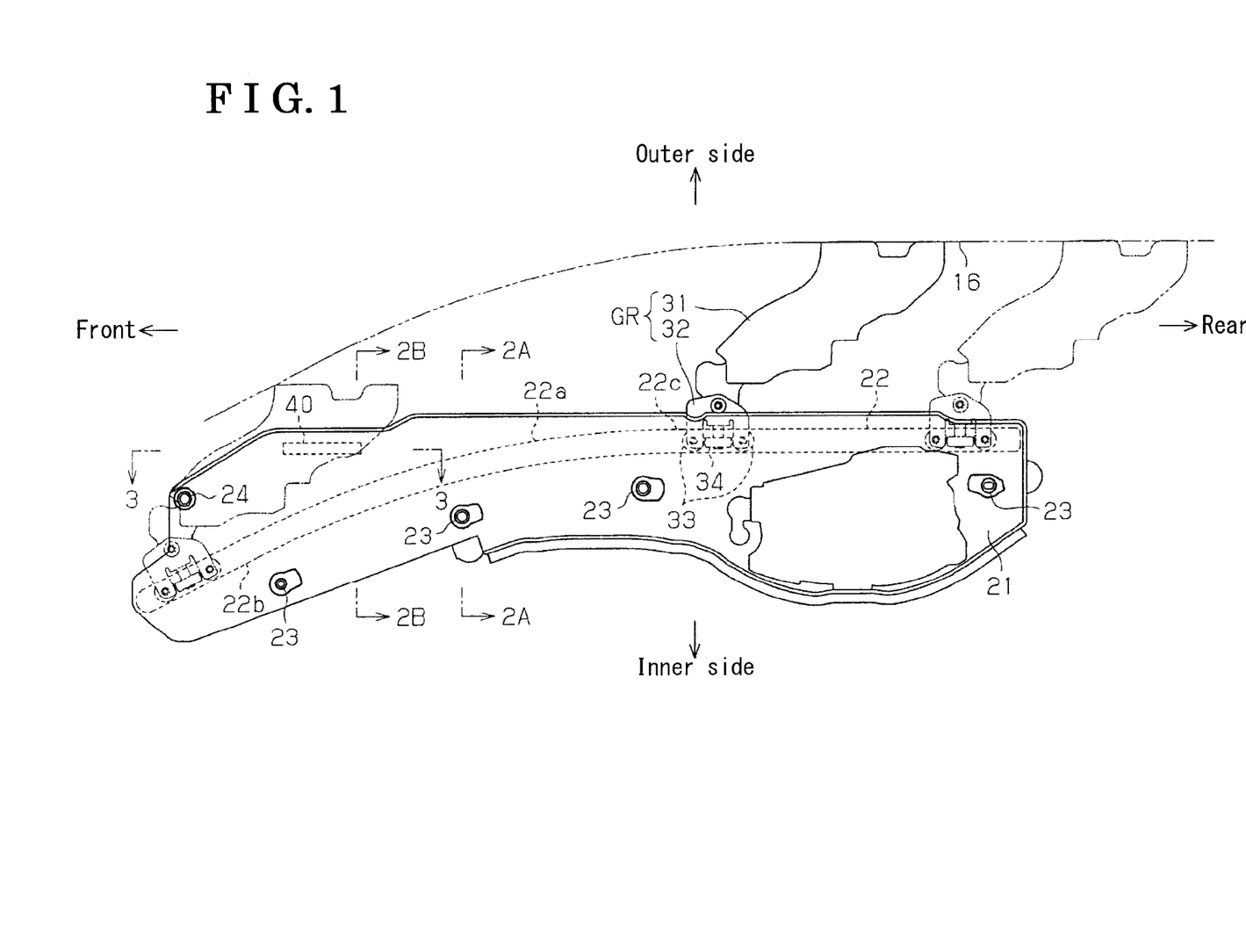
FIG. 1 is a plan view of a step apparatus for a vehicle according to an embodiment disclosed here.

As illustrated in FIG. 1, the step panel 17 made of resin material, for example, includes a body portion 21 formed substantially in a plate form extending in the front-rear direction, and a lower rail 22 serving as a guide rail protruding downward (i.e., at a back side orthogonal to a paper on which FIG. 1 is drawn) from a portion of the body portion 21 at the vehicle outer side. The lower rail 22 includes a curved portion 22a, a curved inclination portion 22b and a linear portion 22c. The curved portion 22a is formed at a substantially intermediate portion in a longitudinal direction of the lower rail 22. The curved inclination portion 22b formed at a front side of the curved portion 22a is inclined to the vehicle inner side towards the front direction. The linear portion 22c formed at a rear side of the curved portion 22a extends rearward. Thus, a front end portion of the body portion 21 at the vehicle outer side relative to the lower rail 22 is elongated in a width direction of the vehicle by an amount corresponding to the inclination of the curved inclination portion 22b as compared to a rear end portion of the body portion 21 at the vehicle outer side relative to the lower rail 22.

The step panel 17 includes plural attachment portions 23 extending downward from the body portion 21 so that the attachment portions 23 are positioned adjacent to the lower rail 22 at the vehicle inner side. In addition, the step panel 17 includes an attachment portion 24 extending downward from the body portion 21 so that the attachment portion 24 is positioned at a front side of the lower rail 22 to be adjacent thereto at the vehicle outer side. The plural attachment portions 23 are disposed to be spaced away in the front-rear direction substantially along the lower rail 22.

Figure 2A:
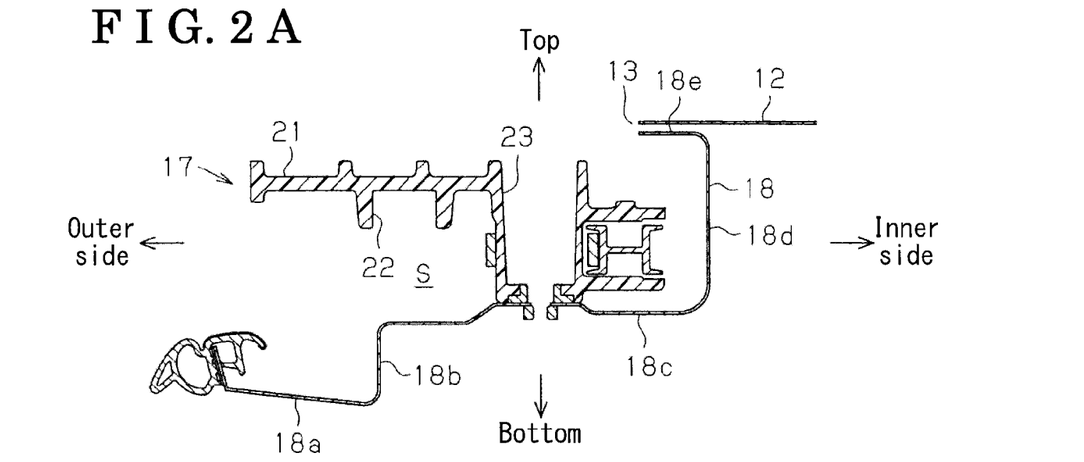
FIG. 2A is a cross-sectional view taken along line IIA-IIA in FIG. 1.

As illustrated in FIG. 2A, each of the attachment portions 23 is formed in a substantially cylindrical form with a bottom (a bottom wall), a center line of the cylindrical form extending in the height direction of the vehicle. An under panel 18 serving as a step support portion is fixed to the body 10 so as to conform to the position or arrangement of the recess portion 13 of the floor 12. The under panel 18, which is made of a metal plate, for example, includes a first bottom wall 18a, a step portion 18b, a second bottom wall 18c, a vertical wall 18d, and a flange 18e. The first bottom wall 18a is disposed at the vehicle outer side (i.e., facing the vehicle outer side). The step portion 18b is connected to an end portion of the first bottom wall 18a at the vehicle inner side to extend upward. The second bottom wall 18c is connected to an upper end of the step portion 18b to extend to the vehicle inner side. The vertical wall 18d is connected to an end portion of the second bottom wall 18c at the vehicle inner side to extend upward. The flange 18e is connected to an upper end of the vertical wall 18d to extend to the vehicle outer side. The position of the flange 18e in the height direction of the vehicle substantially matches the position of the floor 12 in the height direction of the vehicle.

The step panel 17 is fastened and fixed to the under panel 18 by means of fastening members such as bolts, clips, or the like, for example, which penetrate through the second bottom wall 18c and bottom walls of the respective attachment portions 23 mounted to the second bottom wall 18c. An end of the flange 18e at the vehicle outer side is positioned at the vehicle inner side relative to the attachment portions 23. Thus, an upper side of each of the attachment portions 23 is opened and cleared. In addition, a portion of the body portion 21 at the vehicle outer side relative to the attachment portions 23 forms a void S along with the under panel 18. The void S extends in the height direction of the vehicle by an amount corresponding to a height of each of the attachment portions 23. In the void S, a portion at the vehicle outer side is enlarged in the height direction of the vehicle relative to a portion at the vehicle inner side by an amount corresponding to a height of the step portion 18b. The lower rail 22 is positioned at an upper side of a portion of the second bottom wall 18c at the vehicle outer side relative to the attachment portions 23. That is, a portion of the step panel 17 including the lower rail 22 at the vehicle outer side relative to the attachment portions 23 is supported at the under panel 18 in a cantilever manner. The front end portion of the body portion 21 at the vehicle outer side relative to the lower rail 22 is elongated in the width direction of the vehicle as compared to the rear end portion of the body portion 21 at the vehicle outer side relative to the lower rail 22, which leads to an increase of a degree of cantilever.

The attachment portion 24 basically includes the same configuration as the attachment portion 23 except that an arrangement relationship relative to the lower rail 22 is opposite from the attachment portion 23. The attachment portion 24 is provided to increase support strength of the front end portion of the body portion 21 that is elongated in the width direction of the vehicle.

As illustrated in FIG. 1, a door-side bracket 31 made of a metal plate, for example, and formed in a substantially arm form is fixed to the slide door 16. A guide roller 32 is connected to a distal end portion of the door-side bracket 31 to be rotatable about an axis line that extends in the height direction of the vehicle. The door-side bracket 31 and the guide roller 32 constitute a guide roller unit GR. The guide roller 32 includes a pair of (i.e., front and rear) horizontal rollers 33 and a road roller 34. Each of the horizontal rollers 33 is rotatable about an axis line that extends in the height direction of the vehicle. The road roller 34 is interposed between the horizontal rollers 33 in the front-rear direction to be rotatable about an axis line that extends substantially in a horizontal direction orthogonal to an extending direction of the lower rail 22. The guide roller 32 guides the slide door 16 to move along the lower rail 22 in a state where the horizontal rollers 33 are mounted to the lower rail 22 in a rolling manner. In addition, the guide roller 32 supports a load of the slide door 16 in a state where the road roller 34 is mounted on the second bottom wall 18c in a rolling manner.

In a state where the slide door 16 performs an opening and closing operation, the guide roller unit GR (the door-side bracket 31 and the guide roller 32) moves within the void S. That is, because of the void S, a moving path of the guide roller unit GR is secured or cleared. Although the attachment portion 24 (i.e., a third portion) is positioned at the vehicle outer side relative to the lower rail 22, the guide roller unit GR increases a rotation amount of the guide roller 32 relative to the door-side bracket 31 towards the front side so as to avoid an interference with the attachment portion 24.

Figure 2B:
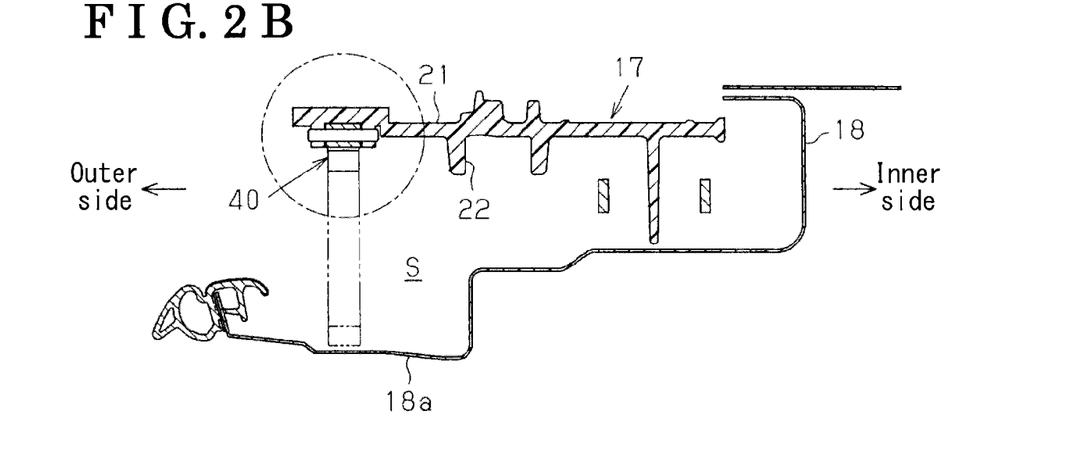
FIG. 2B is a cross-sectional view taken along line IIB-IIB in FIG. 1.
Figure 2C:
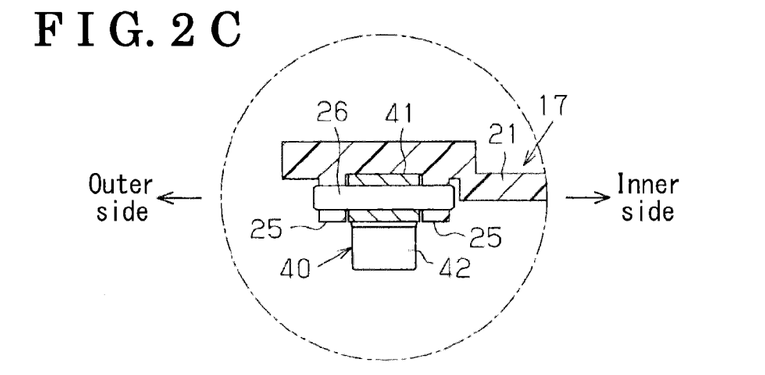
FIG. 2C is an enlarged view of a portion of the step apparatus illustrated in FIG. 2B.

A leg member 40 in a substantially column form is connected to a lower portion of the step panel 17 to be rotatable about an axis line that extends in the width direction of the vehicle. The leg member 40 is positioned at the vehicle outer side of a portion defined between the two adjacent attachment portions 23 (i.e., first and second portions). The two adjacent attachment portions 23 are disposed to face each other in the front-rear direction at the front end portion of the step panel 17. As illustrated in FIGS. 2B and 2C, the step panel 17 includes a pair of support walls 25 extending downward from the body portion 21 and facing each other in the width direction of the vehicle. Then, opposed end portions of a substantially columnar support shaft 26 of which a center line extends in the width direction of the vehicle are fitted in and supported at the respective support walls 25. The leg member 40 includes a substantially cylindrical supported portion 41 of which a center line extends in the width direction of the vehicle and which is disposed between the support walls 25. The leg member 40 is connected to the support shaft 26 to be rotatable thereabout in a state where the support shaft 26 is fitted in the supported portion 41 between the support walls 25.

Figure 3:
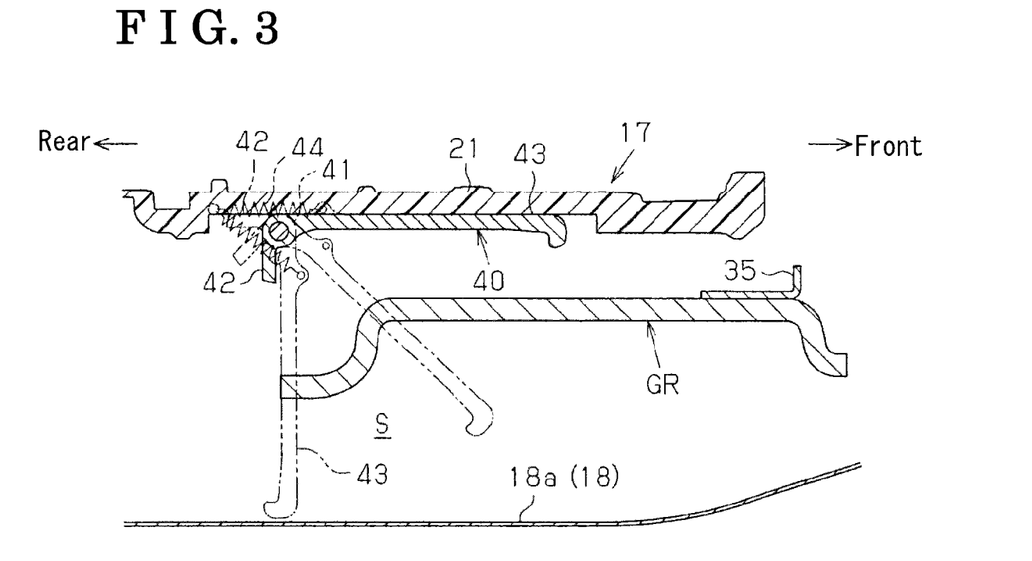
FIG. 3 is a cross-sectional view taken along line III-III in FIG. 1.

As illustrated in FIG. 3, the leg member 40 includes a first pressed portion 42 and a second pressed portion 43 extending from the supported portion 41 in a radial direction with reference to the supported portion 41 so that the first pressed portion 42 and the second pressed portion 43 are orthogonal to each other. A length of the first pressed portion 42 is specified to be shorter than a length of the second pressed portion 43. The rotation of the leg member 40 is restricted within a range that is defined from a state where the second pressed portion 43 makes contact with a lower surface of the body portion 21 at a front side of the supported portion 41 to a state where the first pressed portion 42 makes contact with the lower surface of the body portion 21 at a rear side of the supported portion 41.

In a state where the second pressed portion 43 is in contact with the lower surface of the body portion 21, i.e., in a state where the leg member 40 is in a retracted state, the first pressed portion 42 extends downward and a distal end portion thereof overlaps, in the height direction of the vehicle, an upper end portion of a pressing portion 35 provided at a front end of the guide roller unit GR and including a substantially L-form. On the other hand, in a state where the first pressed portion 42 is in contact with the lower surface of the body portion 21, i.e., in a state where the leg member 40 is in a standing state (i.e., an uprising or deployed state), the second pressed portion 43 extends downward and a distal end portion thereof makes contact or comes closer to an upper surface of the first bottom wall 18a of the under panel 18. The second pressed portion 43 overlaps the guide roller unit GR in the height direction of the vehicle.

A tensile coil spring 44 serving as a biasing member is disposed between the body portion 21 and the second pressed portion 43 in a state where respective ends of the tensile coil spring 44 engage with the body portion 21 and the second pressed portion 43. The tensile coil spring 44 functions to selectively hold the aforementioned two states (the retracted state and the standing state) of the leg member 40. Specifically, the tensile coil spring 44 is arranged to be most expanded at a predetermined rotation position halfway between the two states and is arranged to be gradually contracted when rotating towards any of the two states. That is, the biasing force of the tensile coil spring 44 is specified to gradually decrease in a case where the leg member 40 rotates towards any of the aforementioned two states.

Figure 4A:
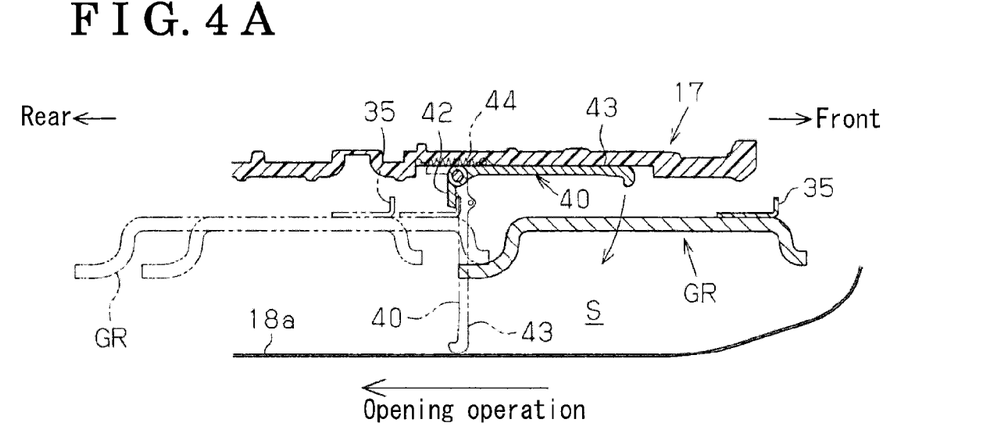
FIG. 4A is a cross-sectional view illustrating a retracted state of a leg member.

As illustrated in FIG. 4A, in a case where the slide door 16 is positioned close to a fully closed state (for example, in a substantially fully closed state), the leg member 40 is in the retracted state and the pressing portion 35 of the guide roller unit GR is positioned at the front side of the leg member 40. Thus, in a case where the guide roller unit GR moves rearward together with the slide door 16 in association with an opening operation of the slide door 16, the leg member 40 where the distal end portion of the first pressed portion 42 is pressed by the pressing portion 35 rotates in a clockwise direction in FIG. 4A (i.e., a first direction). Then, the first pressed portion 42 moves away from the moving path of the guide roller unit GR and the second pressed portion 43 is brought to extend between the body portion 21 of the step panel 17 and the first bottom wall 18a (for example, to stand on the first bottom wall 18a or to be positioned substantially upright relative to the first bottom wall 18a). At this time, the tensile coil spring 44 turns over to bias the leg member 40 so that the leg member 40 is shifted to the standing state and to maintain the leg member 40 in the standing state. The guide roller unit GR (the pressing portion 35) moves and passes through the leg member 40 prior to the rotation of the second pressed portion 43 of the leg member 40 that is in the process of shifting to the standing state. Thus, the rearward movement of the guide roller unit GR is not blocked by the leg member 40.

Figure 4B:
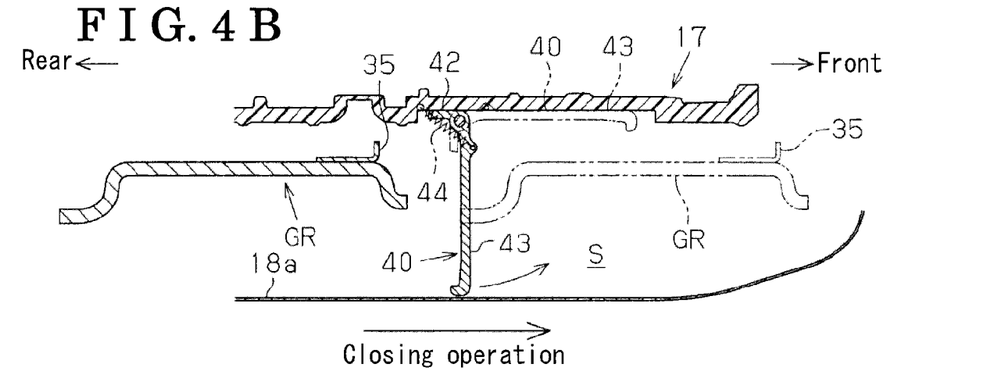
FIG. 4B is a cross-sectional view illustrating a standing state of the leg member.

On the other hand, in a case where the slide door 16 is positioned close to a fully open state (for example, in a substantially fully open state) as illustrated in FIG. 4B, the leg member 40 is in the standing state and the guide roller unit GR is positioned at the rear side of the leg member 40. Thus, in a case where the guide roller unit GR moves forward together with the slide door 16 in association with a closing operation of the slide door 16, the leg member 40 where the second pressed portion 43 is pressed by the guide roller unit GR rotates in a counterclockwise direction in FIG. 4B (i.e., a second direction). Then, the second pressed portion 43 moves away from the moving path of the guide roller unit GR and the second pressed portion 43 separates from the first bottom wall 18a. At this time, the tensile coil spring 44 turns over to bias the leg member 40 so that the leg member 40 is shifted to the retracted state and to maintain the leg member 40 in the retracted state. The guide roller unit GR moves and passes through the leg member 40 prior to the rotation of the first pressed portion 42 of the leg member 40 that is in the process of shifting to the retracted state. Thus, the forward movement of the guide roller unit GR is not blocked by the leg member 40. After completion of the shifting of the leg member 40 to the retracted state, the first pressed portion 42 is again positioned on the moving path of the guide roller unit GR.

A function of the embodiment will be explained below. The leg member 40 is arranged to extend between the body portion 21 of the step panel 17 and the first bottom wall 18a of the under panel 18, for example, to stand on the first bottom wall 18a or to be positioned substantially upright relative to the first bottom wall 18a, at a predetermined position on the moving path of the guide roller unit GR in a state where the slide door 16 is opened. Thus, even when a user places one's foot to weight on the step panel 17 above the void S at the time the user gets in or out of the vehicle, for example, the leg member 40 may support the weight of the user.

According to the embodiment, even when a user places one's foot to weight on the step panel 17 above the void S at the time the user gets in or out of the vehicle, for example, the leg member 40 may support the weight of the user. Thus, while an increase of mass resulting from reinforcement is restrained, the support strength may be enhanced. The leg member 40 moves away from the moving path of the guide roller unit GR for securing the moving path before the slide door 16 reaches the leg member 40 during the closing operation so as not to block the closing operation of the slide door 16.

In the embodiment, the leg member 40 is pressed by the guide roller unit GR in association with the opening and closing operation of the slide door 16 so as to be automatically operable, which may lead to a simple configuration of the leg member 40.

In addition, in the embodiment, because the leg member 40 which includes the first pressed portion 42 and the second pressed portion 43 is simply connected to the step panel 17 to be rotatable thereto, the configuration of the leg member 40 may be further simplified.

Further, in the embodiment, the tensile coil spring 44 may selectively maintain the leg member 40 between the retracted state and the standing state, thereby securely maintaining the position or posture of the leg member 40 in each state (i.e., each of the retracted state and the standing state).

Furthermore, in the embodiment, the leg member 40 is disposed at the front end portion of the body portion 21 where the degree of cantilever is greater. Thus, the support strength may further effectively increase. That is, the front end portion of the body portion 21 of the step panel 17 where the degree of cantilever is greater may be supported by the leg member 40 in addition to the two attachment portions 23 (i.e., the first and second portions) provided forward and the attachment portion 24 (i.e., the third portion).

Furthermore, in the embodiment, even in a case where the user places one's foot to weight on the step panel 17 above the void S when the user gets in or out of the vehicle, for example, a load that is locally generated may be dispersed by the leg member 40.

In the embodiment, instead of the tensile coil spring 44, a compression coil spring or a torsional coil spring, for example, may be employed. In addition, as long as the position or posture of the leg member 40 in each of the retracted state and the standing state is stabilized, the tensile coil spring 44 may be omitted.

In the embodiment, the position where the leg member 40 is arranged may be appropriately specified as long as the leg member 40 is disposed at the vehicle outer side relative to the attachment portions 23. In addition, plural leg members 40 may be provided in the embodiment. The positions where the plural leg members 40 are arranged may be appropriately specified as long as the leg members 40 are disposed at the vehicle outer side relative to the attachment portions 23.

In the embodiment, the lower rail 22 may be formed by an individual and separate member from the step panel 17. In this case, the lower rail 22 may be disposed at an appropriate position of the body 10.

In the embodiment, the leg member 40 may be retracted and deployed in the vehicle height direction, for example, so as to be switched between the retracted state and the standing (deployed) state. In addition, the leg member 40 may be electrically switched between the retracted state and the standing state by an electric drive source (motor or the like), for example.

In the embodiment, the term "the second pressed portion 43 extends between the body portion 21 of the step panel 17 and the first bottom wall 18a" includes a meaning in which the leg member 40 stands on the first bottom wall 18a in a state to be in contact therewith and a meaning in which the leg member 40 is positioned upright or substantially upright relative to the first bottom wall 18a in a state to be contactable therewith so that the leg member 40 comes contact with the first bottom wall 18a when a user places one's foot to weight on the step panel 17, for example.

According to the step apparatus of the embodiment, the lower rail 22 (guide rail) is integrally formed at the step panel 17, and the step panel 17 is fixed to the under panel 18 via two portions (i.e., the first and second portions) at the front end portion of the body portion 21 at the vehicle inner side than the lower rail 22 and via a portion (i.e., the third portion) at the front end portion of the body portion 21 at the vehicle outer side than the lower rail 22. The leg member 40 is disposed within a range sandwiched and disposed between the aforementioned two portions via which the step panel 17 is fixed to the under panel 18.

Accordingly, the support strength may be further effectively enhanced.

In the embodiment, while an increase of mass resulting from reinforcement is restrained, the support strength may increase.

According to the embodiment, the void S is configured to secure the moving path of the guide roller unit GR fixed to the slide door 16 and movably mounted to the lower rail 22 which is fixed to the body 10. The leg member 40 is pressed by the guide roller unit GR in association with the opening operation of the slide door 16 to extend between the step panel 17 and the under panel 18, the leg member 40 being pressed by the guide roller unit GR in association with the closing operation of the slide door 16 to separate from the under panel 18 for clearing the moving path of the guide roller unit GR.

In addition, according to the embodiment, the leg member 40 is rotatably connected to the step panel 17 by including the first pressed portion 42 and the second pressed portion 43 which are different portions from each other. The leg member 40 rotates in the first direction in a state where the first pressed portion 42 is pressed by the guide roller unit GR in association with the opening operation of the slide door 16 to cause the first pressed portion 42 to move away from the moving path of the guide roller unit GR and to cause the second pressed portion 43 to extend between the step panel 17 and the under panel 18. The leg member 40 rotates in the second direction in a state where the second pressed portion 43 is pressed by the guide roller unit GR in association with the closing operation of the slide door 16 to cause the second pressed portion 43 to move away from the moving path of the guide roller unit GR and to cause the second pressed portion 43 to separate from the under panel 18.

Further, according to the embodiment, the step apparatus further includes the tensile coil spring 44 selectively maintaining the state (i.e., the standing state) in which the leg member 40 extends between the step panel 17 and the under panel 18 and the state (i.e., the retracted state) in which the moving path is cleared by the leg member 40.

Further, according to the embodiment, the lower rail 22 is integrally formed at the step panel 17. The step panel 17 includes the body portion 21 extending in the front-rear direction of the vehicle, the step panel 17 being fixed to the under panel 18 via first and second portions (the attachment portions 23) at the front end portion of the body portion 21 in the front-rear direction of the vehicle, the first and the second portions (the attachment portions 23) being positioned at the vehicle inner side relative to the lower rail 22, and via the third portion (the attachment portion 24) at the front end portion of the body portion 21, the third portion (the attachment portion 24) being positioned at the vehicle outer side relative to the lower rail 22. The leg member 40 is arranged within a range defined between the first and second portions (the attachment portions 23).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A step apparatus for a vehicle, comprising:
a step panel facing an opening formed at a body of a vehicle and fixed to a step support portion which is provided at the body, the step panel made of resin and securing a moving path of an opening and closing member that is configured to open and close the opening, the moving path being secured at a void defined between the step panel and the step support portion in a height direction of the vehicle; and
a leg member connected to the step panel and configured to extend between the step panel and the step support portion at a predetermined position on the moving path in an open state of the opening and closing member, the leg member moving away from the moving path for clearing the moving path before the opening and closing member reaches the leg member during a closing operation of the opening and closing member, wherein
the void is configured to secure a moving path of a guide roller unit fixed to the opening and closing member and movably mounted to a guide rail which is fixed to the body, the leg member is pressed by the guide roller unit in association with an opening operation of the opening and closing member to extend between the step panel and the step support portion, the leg member being pressed by the guide roller unit in association with the closing operation of the opening and closing member to separate from the step support portion for clearing the moving path of the guide roller unit.

2. The step apparatus according to claim 1, wherein
the leg member is rotatably connected to the step panel by including a first pressed portion and a second pressed portion which are different portions from each other,
the leg member rotates in a first direction in a state where the first pressed portion is pressed by the guide roller unit in association with the opening operation of the opening and closing member to cause the first pressed portion to move away from the moving path of the guide roller unit and to cause the second pressed portion to extend between the step panel and the step support portion,
the leg member rotates in a second direction in a state where the second pressed portion is pressed by the guide roller unit in association with the closing operation of the opening and closing member to cause the second pressed portion to move away from the moving path of the guide roller unit and to cause the second pressed portion to separate from the step support portion.

3. The step apparatus according to claim 1, further comprising a biasing member selectively maintaining a state in which the leg member extends between the step panel and the step support portion and a state in which the moving path is cleared by the leg member.

4. The step apparatus according to claim 1, wherein
the guide rail is integrally formed at the step panel,
the step panel includes a body portion extending in a front-rear direction of the vehicle, the step panel being fixed to the step support portion via first and second portions at a front end portion of the body portion in the front-rear direction of the vehicle, the first and the second portions being positioned at a vehicle inner side relative to the guide rail, and via a third portion at the front end portion of the body portion, the third portion being positioned at a vehicle outer side relative to the guide rail,
the leg member is arranged within a range defined between the first and second portions.

* * * * *